United States Patent
Aou et al.

(10) Patent No.: US 12,060,506 B2
(45) Date of Patent: Aug. 13, 2024

(54) VISCOELASTIC FOAM WITH SLOW RECOVERY TIME

(71) Applicants: DOW GLOBAL TECHNOLOGIES LLC, Midland, MI (US); ROHM AND HAAS COMPANY, Collegeville, PA (US)

(72) Inventors: Kaoru Aou, Lake Jackson, TX (US); William A. Koonce, Lake Jackson, TX (US); Qinghao Meng, Angleton, TX (US); Christopher Thiede, Lake Jackson, TX (US); William Griffith, Jr., North Wales, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 999 days.

(21) Appl. No.: 16/979,302

(22) PCT Filed: Mar. 8, 2019

(86) PCT No.: PCT/US2019/021420
§ 371 (c)(1),
(2) Date: Sep. 9, 2020

(87) PCT Pub. No.: WO2019/177900
PCT Pub. Date: Sep. 19, 2019

(65) Prior Publication Data
US 2020/0399508 A1    Dec. 24, 2020

Related U.S. Application Data

(60) Provisional application No. 62/642,348, filed on Mar. 13, 2018.

(51) Int. Cl.
*C09J 7/38*    (2018.01)
*C09J 7/26*    (2018.01)

(52) U.S. Cl.
CPC .............. *C09J 7/385* (2018.01); *C09J 7/26* (2018.01); *C09J 2400/243* (2013.01); *C09J 2433/00* (2013.01); *C09J 2475/006* (2013.01)

(58) Field of Classification Search
CPC . C09J 7/385; C09J 7/26; C09J 2433/00; C09J 2475/006; C09J 2301/302; C09J 7/38–387; C09J 2400/243–246; C08G 2110/0008; C08G 2110/005; C08G 2110/0058; C08J 2205/05; C08J 2205/06; C08J 2333/04; C08J 2375/04; C08J 9/42
See application file for complete search history.

(56) References Cited

U.S. PATENT DOCUMENTS

| | | | | |
|---|---|---|---|---|
| 2,884,126 | A * | 4/1959 | Ulrich | C09J 7/38 |
| | | | | 526/318.2 |
| 4,008,350 | A * | 2/1977 | Crawford | C08J 9/42 |
| | | | | 521/137 |
| 4,345,044 | A * | 8/1982 | Columbus | C08K 3/346 |
| | | | | 524/451 |
| 4,595,610 | A | 6/1986 | Fey | |
| 4,725,627 | A | 2/1988 | Aranson | |
| 2013/0225706 | A1* | 8/2013 | Ma | C08G 18/4845 |
| | | | | 521/110 |

FOREIGN PATENT DOCUMENTS

| | | | | |
|---|---|---|---|---|
| CN | 107652910 A | * | 2/2018 | |
| EP | 2851478 A1 | * | 3/2015 | ........... E04B 1/6812 |
| GB | 1342115 | * | 12/1973 | |
| JP | H11-170469 A | | 6/1999 | |

OTHER PUBLICATIONS

"RHOPLEX E-32 NP and RHOPLEX E-358 Emulsions" by Dow. Form No. 877-00397. (Year: 2013).*
Translation of EP 2851478 by Windl. (Year: 2015).*
Translation of CN 107652910 by Ren. (Year: 2018).*

* cited by examiner

*Primary Examiner* — Michael M Dollinger
*Assistant Examiner* — Christina H. W. Rosebach

(57) ABSTRACT

Recovery times of flexible polyurethane foams are increased by treatment with a pressure sensitive adhesive. An emulsion or dispersion of the adhesive in an aqueous carrier liquid is impregnated into the foam, with subsequent removal of the carrier. This invention is of special interest when the glass transition temperature of the starting foam is 16° C. or lower.

14 Claims, No Drawings

VISCOELASTIC FOAM WITH SLOW RECOVERY TIME

This invention relates to viscoelastic foam characterized in having a prolonged recovery time and to methods for making such a viscoelastic foam.

Viscoelastic (VE) polyurethane foam represents a fast-growing segment of the polyurethane foam industry. VE foam is characterized by having low resiliency values and by their slow recovery from compression. These properties distinguish the VE foams from HR (High Resiliency) and "conventional" flexible polyurethane foams, which have much greater resiliency and which recover almost immediately after compression. These viscoelastic foams are sometimes marketed as "memory" foam. They are being used increasingly in pillows and mattresses, where the viscoelastic character of the foam, in particular the low resiliency and long recovery times, imparts a feel that consumers perceive as highly comfortable. They are also used in acoustic applications to reduce NVH (noise, vibration and harshness) and in various applications such as earplugs where slow recovery is advantageous.

The low resiliency values and slow recovery of VE foams are generally attributable at least in part to their glass transition temperature, which should be close to the use temperature. For example, VE foam for bedding applications (mattresses, pillows) often has a glass transition temperature of the foam close to the human torso body temperature. Therefore, many VE foams tend to have glass transition temperatures ($T_g$s) in the range of about 20 to 30° C. In some cases, a VE foam may have a glass transition temperatures as low as 10° C., but these lower $T_g$ foams tend to have undesirably short recovery times.

VE foams having $T_g$s of 20° C. to 30° C. exhibit a large change of properties when cooled from above to below their glass transition temperature, or vice versa. It should be kept in mind that a glass transition temperature is not a sharp transition like a crystalline melting point, but a phenomenon that occurs over a range of temperatures near the particular temperature that is designated the "glass transition temperature" of the foam according to a particular test. Foams that have glass transition temperatures near room temperature therefore tend to have highly variable properties, depending on the ambient temperature at any given time. For example, the hardness of the foam (and therefore its perceived comfort) can change significantly with increases in ambient temperature that commonly occur with the change of seasons, the time of day or even the operation of an HVAC system within a room or building.

The somewhat high glass transition temperature also creates certain disadvantages from a manufacturing perspective. VE foams are generally prepared in a slabstock process that forms large foam buns. The buns are subsequently cut down into smaller sections for assembly into specific products. Foams having a glass transition temperature of 20° C. or more often are stored at lower temperatures, at which they become harder and more difficult to cut and fabricate.

These problems can be ameliorated if the foam has a glass transition temperature of about 16° C. or lower. This is low enough that the properties will remain more or less consistent across the expected range of use temperatures. Therefore, there is a strong desire to provide a foam that has viscoelastic properties (i.e., low resiliency and long recovery times) and which also has a glass transition temperature of 16° C. or lower.

Long recovery times can be achieved even in lower $T_g$ foams if the foam is mostly closed celled. The closed cells inhibit the flow of air in and out of the foam as it is compressed and subsequently decompresses. This pneumatic effect prolongs the recovery time. The problem with this approach is that foams that do not breathe easily do not dissipate body heat or moisture quickly. This heat and moisture becomes trapped near the user's body, leading to lower perceived comfort.

Therefore, it would be desirable to increase recovery times of polyurethane foam, especially polyurethane foam having a glass transition temperature of 16° C. or lower, while preserving good airflow.

More generally, there is a desire to increase the recovery times of a VE foam, and a method for achieving this is wanted.

This invention is a viscoelastic foam comprising a) an open-celled flexible polyurethane foam having internal surfaces coated with b) a pressure sensitive adhesive having a glass transition temperature of at most 0° C., wherein the pressure sensitive adhesive constitutes 1.5 to 35% of the combined weight of a) and b).

The invention is also a method of increasing the recovery time of an open-celled polyurethane foam, comprising (1) impregnating a starting flexible polyurethane foam with a solution or emulsion of a pressure sensitive adhesive in a liquid carrier, the pressure sensitive adhesive having a glass transition temperature of no greater than 0° C., to wet internal surfaces of the foam and form an impregnated foam, and (2) removing the liquid carrier from the impregnated foam to produce a coating of the pressure sensitive on the internal surfaces of the flexible polyurethane foam.

The invention is also a flexible polyurethane foam made in the foregoing method.

The pressure sensitive adhesive coating increases the recovery time of the foam. The increase in recovery time tends to become greater with increased loadings of the pressure sensitive adhesive. Resiliency, as measured by the ball rebound test of ASTM D-3574, Test H, remains low. Foam density increases slightly compared to the uncoated foam due to the added weight of the pressure sensitive adhesive. Airflow tends to remain constant or is even increased, which indicates that the coating does not close cells or otherwise impede the movement of gas in and out of the foam as it is compressed and decompressed. Some cell opening may take place during step (2).

Another significant advantage of this invention is that it permits excellent viscoelastic properties (low resiliency and long recovery times) to be achieved together with high airflows, even when the polyurethane foam by itself has a somewhat low glass transition temperature, such as 16° C. or below. The foams therefore have a very desirable set of haptic properties that make them excellent candidates for bedding and other comfort applications in which the foam becomes exposed to the body heat of and/or water vapor evaporating from the body of a human user. The foam or an article containing the foam may in such applications support at least a portion of the weight of a human user.

This invention also provides significant advantages to foam fabricators who must cut the foam for assembly into a downstream product, as the foam remains soft through ordinary seasonal and diurnal variations in warehousing temperatures and so remains easy to cut and otherwise fabricate.

The starting flexible polyurethane foam may have a foam density of, for example, at least 24 kg/m³, at least 32 kg/m³ or at least 40 kg/m³, as measured according to ASTM D3574, Test A. The foam density may be up to 160 kg/m³, up to 120 kg/m³, up to 96 kg/m³, up to 80 kg/m³ or up to 64 kg/m³.

The starting polyurethane foam is considered to be "flexible" for purposes of this invention if it exhibits an elongation to break of at least 50% as measured according to ASTM D3574, Test E. The starting polyurethane foam may exhibit an elongation to break of at least 75% or at least 100%.

The starting polyurethane foam may exhibit a resiliency, as measured by the ASTM D3574, Test H (ball rebound test), of up to 65%. In preferred embodiments, the resiliency of the starting polyurethane foam may be no more than 30%, no more than 20%, no more than 15%, no more than 12%, no more than 10%, no more than 8%, or no more than 6% on that test.

The starting polyurethane foam may have a glass transition temperature of, for example, 10 to 35° C. In some embodiments, the glass transition temperature is at most 20° C. or at most 16° C. All glass transition temperatures mentioned herein can be measured by dynamic mechanical analysis using a solids analyzer such as an RSA-G2 Solids Analyzer from TA Instruments. The glass transition temperature is taken as the peak of the tan delta curve. Suitable test conditions using this device to determine the glass transition temperature of the starting polyurethane foam are: cylindrical sample dimensions—10 mm thick, 20 mm diameter; compression mode; frequency 1 Hz; strain 0.1%; preload: 15.0 g; heating rate: 3° C./minute.

The starting polyurethane foam preferably is open-celled. However, some cell opening may take place during the compression step (2), in which case a closed-cell starting foam or partially closed-cell starting foam can be used. A polyurethane foam (starting or coated in accordance with the invention) is considered as "open-celled" for purposes of this invention if it has an airflow of at least 0.5 scfm (standard cubic feet/minute) (0.237 L/s) as measured according to ASTM D3574, Test G. The starting flexible polyurethane foam may have an airflow of at least 1 scfm (0.472 L/s) or at least 2 scfm (0.944 L/s). The airflow of the starting polyurethane foam may be, for example, up to 20 scfm (9.44 L/s), up to 10 scfm (4.72 L/s) or up to 7.5 scfm (3.54 L/s).

The starting polyurethane foam may exhibit a recovery time of up to one second, up to two seconds, or any longer recovery time. The invention is especially applicable to starting polyurethane foams that have low recovery times, such as five seconds or less, 2.5 seconds or less or one second or less. Recovery time for purposes of this invention is measured by compressing a 2.0-inch (5.08 cm) thick foam piece (4.0×4.0×2.0 inches, 10.16×10.16×5.08 cm) to 24% of its original thickness at room temperature, holding the foam at that compression for one minute and releasing the compressive force. The time required after the compressive force is released for the foam to regain 95% of original foam thickness is the recovery time. Recovery time is conveniently measured using a viscoelastic foam-testing device such as a RESIMAT 150 device (with factory software) from Format Messtechnik GmbH.

The starting polyurethane foam should be unskinned on at least one surface to permit the pressure sensitive adhesive emulsion or solution to penetrate into the foam to apply the coating. Skin should be removed from at least one surface of a skinned foam.

Flexible polyurethane foams are well known and can be prepared in a reaction of a reaction mixture that comprises one or more polyisocyanates, one or more polyols and at least one blowing agent. The reaction mixture may contain additional ingredients such as, for example, one or more catalysts for the reaction of the polyisocyanate with alcohol groups and/or water; one or more foam-stabilizing surfactants; one or more crosslinkers or chain extenders, and one or more monoalcohols.

Suitable methods for making a starting flexible polyurethane foam are described, for example, in *Handbook of Polymeric Foams and Foam Technology*, 2$^{nd}$ Ed., Klempner and Sendijarevic, editors, Hanser Publishers (2004). Suitable methods of making a starting viscoelastic polyurethane foam are described, for example, in U.S. Pat. Nos. 6,391,935, 7,208,531 and 7,238,730; US Published Patent Application No. 2009-0292037; EP 1641858; WO 2014/058857 and WO 2016/205054.

Suitable starting flexible polyurethane foams are widely available commercially from many suppliers such as Interplasp Espumas de Poliuretano, Yecla, Spain; Carpenter Company, Richmond, Virginia US; FXI, Inc., Media, Pennsylvania US; Foamex International, Inc., Linwood, Pennsylvania US; and Foshan EON Technology Industry Co., Ltd., Foshan City, China, among many others.

The pressure sensitive adhesive is an elastomeric polymer composition that, after removal of the carrier, exhibits a loop tack of at least 2 N/inch² (0.31 N/cm²) at 22° C. when coated onto 1.2 mil (0.3 mm) biaxially oriented polypropylene at a coating weight of 21 g/m², as measured according to ASTM D-6195 Method B, and exhibits a 180° peel adhesion of at least 1.25 N/inch (0.49 N/cm) when coated onto 1.2 mil (0.3 mm) biaxially oriented polypropylene at a coating weight of 21 g/m, measured against stainless steel after a one minute dwell time according to PSTC #1.

The pressure sensitive adhesive, after drying, has a glass transition temperature of no greater than 0° C. Its glass transition temperature may be no greater than −10° C., no greater than −20° C., no greater than −30° C. or no greater than −40° C., and may be as low as, for example, −140° C. or as low as −120° C.

The pressure sensitive adhesive composition includes at least one elastomeric polymer that is not isocyanate-based. By "isocyanate-based" it is meant a material that contains and/or is manufactured from one or more isocyanate compounds. Isocyanate-based polymers include, for example, carbamate compounds; urethane and/or urea oligomers or polymers that may contain isocyanate and or hydroxyl groups; isocyanurate polymers and oligomers, biurets, allophonates, carbodiimides and like compounds containing one or more groups that are formed in the reaction of an isocyanate group.

Examples of suitable non-isocyanate-based elastomeric polymers are alkyl acrylate polymers such as polymers of one or more of ethyl acylate, methyl acrylate, n-butyl acrylate and 2-ethylhexyl acrylate; styrene-conjugated diene block copolymers, natural rubber; butyl rubbers, various nitrile polymers, various ethylene vinyl acetate copolymers, and various silicone rubbers.

The elastomeric polymer may be a two-part, curable type that includes a curable resin component and a curing agent. In such a case, the curable resin component and curing agent preferably are combined immediately before or at the same time as the solution or emulsion is contacted with the starting polyurethane foam. One-part, non-curable types are preferred.

The pressure sensitive adhesive may include one or more tackifiers. Tackifiers are generally low molecular weight materials (e.g., <1000 g/mol) that have a softening temperature above room temperature. The tackifier preferably has a boiling temperature of greater than 100° C. Tackifiers may comprise as much as 75% of the combined weight of the elastomeric polymer and tackifier in the pressure sensitive adhesive, although some pressure sensitive adhesives, notably acrylic polymers, may not require a tackifier.

Examples of useful tackifiers include rosins, terpenes and modified terpenes, aliphatic, cycloaliphatic and aromatic resins ($C_5$ aliphatic resins, $C_9$ aromatic resins, and $C_5/C_9$ aliphatic/aromatic resins), hydrogenated hydrocarbon resins, and their mixtures, and terpene-phenol resins. So-called "MQ" silicate resins such as those composed of a reaction product of a monofunctional trimethyl silane reacted with silicon tetrachloride are useful tackifiers for silicone elastomers.

The pressure sensitive adhesive is applied in the form of a solution or emulsion in a liquid carrier. By "carrier", it is meant a solvent in which the pressure sensitive adhesive is dissolved or the continuous liquid phase of a dispersion of droplets or particles of the pressure sensitive adhesive. The carrier preferably is water or a mixture of at least 40% by weight water and up to 60% by weight of a water-soluble organic compound that has a boiling temperature lower than 100° C. However, organic solvents or carriers, particularly organic compounds having boiling temperatures lower than 100° C., can also form all or part of the carrier. Organic solvents or carriers that can be used by themselves, in admixture with each other, or with water, include, for examples, alkanols having 1 to 6, especially 2 to 3 carbon atoms, ketones such as acetone and methyl ethyl ketone, ether solvents such as ethylene glycol monomethyl ether, ethylene glycol monomethyl ether, diethyl ether, dimethyl ether and tetrahydrofuran; aliphatic and/or aromatic hydrocarbons, and the like.

The carrier liquid may constitute, for example, from 25 to 99.9% of the total weight of the solution or emulsion of the pressure sensitive adhesive. More dilute solutions (i.e., containing higher amounts of carrier liquid) often have the advantage of lower viscosity, which favors easy permeation into the cells of the polyurethane foam. Thus, the carrier liquid preferably constitutes at least 45%, at least 60% or at least 75% of the weight of the solution or emulsion.

A preferred pressure sensitive adhesive is an acrylic polymer being a polymer of one or more of ethyl acrylate, n-butyl acrylate and 2-ethylhexyl acrylate, optionally copolymerized with one or more other copolymerizable monomers. The acrylic polymer has a glass transition temperature of no greater than −10° C., preferably no greater than −20° C. The acrylic polymer preferably is applied in the form of an emulsion in a liquid carrier that includes at least 30% water, based on the weight of the liquid carrier, and from 0 to 70%, preferably 0 to 50%, by weight of the liquid carrier, or a water-soluble organic solvent having a boiling temperature of 40 to 100° C. The water-soluble organic solvent is preferably methanol, ethanol, n-propanol or isopropanol.

The solids content (weight of pressure sensitive adhesive including any tackifier as a percentage of the combined weight of pressure sensitive adhesive plus carrier) may be, for example, from 1 to 75%. Lower solids content emulsions or solutions, such as those having solids contents of 1 to 50%, 1 to 25%, 2 to 20% or 2 to 15%, have the advantage of lower viscosity, which facilitates impregnation into the starting polyurethane foam. Pressure sensitive adhesive products that are manufactured and/or sold as higher-solids materials can be diluted if desired by adding more water and/or other carrier.

The pressure sensitive adhesive is coated onto internal surfaces of the starting polyurethane foam. This can be accomplished by (1) performing an impregnation step, wherein the starting flexible polyurethane foam is impregnated with the solution or emulsion of the pressure sensitive adhesive to wet internal surfaces of the foam and form an impregnated foam, followed by (2) performing a step in which the liquid carrier is removed from the impregnated foam to produce a coating of the pressure sensitive on the internal surfaces of the flexible polyurethane foam.

The impregnation step is performed by bringing the pressure sensitive adhesive solution or emulsion starting polyurethane foam into contact with interior surfaces of the starting polyurethane foam. This can be accomplished, for example, by immersing the starting polyurethane foam into the solution or emulsion and/or by applying the solution or emulsion to a surface of the polyurethane foam and allowing it to penetrate into the foam. Alternatively, the solution or emulsion can be applied to the starting polyurethane foam by methods such as spraying, roller transfer, and/or pouring and spreading with a brush, stick, squeegee, or the like.

Enough of the solution or emulsion of the pressure sensitive adhesive is sufficient to provide the coated foam product with an amount of pressure sensitive adhesive as described below.

It is generally beneficial to "work" the pressure sensitive adhesive solution or emulsion into the foam by mechanically compressing the foam while immersed or otherwise in contact with the solution or emulsion, to (temporarily) mechanically remove trapped gases from the foam, promote the movement of the solution or emulsion into and throughout the body of the foam, and wet out interior foam surfaces. The compression may be, for example, to 50% or less, to 35% or less or 25% or less, or to even 10% or less of the volume of the starting foam. The compression step may be performed multiple times if desired.

This working or mechanical compression step may result in some cell opening. Mechanical cell opening is frequently performed on flexible polyurethane foam to break cell windows and thereby promote increased airflow. The starting polyurethane foam may have been mechanically crushed in such a manner. In some embodiments, mechanical cell opening can be performed simultaneously with at least a portion of the impregnation step of this invention, by performing the mechanical crushing step in the presence of the pressure sensitive adhesive solution or emulsion.

The mechanical compression step also helps to remove excess quantities of the pressure sensitive adhesive solution or emulsion from the polyurethane foam.

The compressive force is removed after each mechanical compression step to allow the foam to re-expand and gas to re-enter the cells.

The liquid carrier is then removed from the impregnated foam to produce a coating of the pressure sensitive on the internal surfaces of the flexible polyurethane foam. This step can be done at room temperature (22° C.) or an elevated temperature at which the polyurethane foam does not degrade or melt to lose its cellular configuration. A temperature of up to 140° C., such as from 50 to 100° C., is especially suitable. The carrier removal step can be performed, for example, in an oven or under infrared lamps, or on other heating apparatus when the carrier removal is performed at elevated temperature.

The carrier removal step is conveniently performed until the foam with applied pressure sensitive adhesive reaches a constant weight, indicating full removal of the liquid carrier. The needed time will of course depend on temperature, foam sample size, loading of the solution or emulsion and the particular carrier(s) (among other factors), but in general from 10 minutes to 12 hours is suitable.

The product obtained from the carrier removal step is an open-celled flexible polyurethane foam having internal surfaces coated with the pressure sensitive adhesive, wherein the pressure sensitive adhesive constitutes 1.5 to 35% of the combined weight of a) and b). In general, recovery times increase with increasing loadings of the pressure sensitive adhesive. Very little if any increase in recovery time is seen when the amount of pressure sensitive is less than about 1.5%. Amounts above about 35% provide little additional benefit. The amount of pressure sensitive adhesive may be at least 2% or at least 5% and may be up to 25%, up to 20%, up to 15%, up to 10% or up to 5% on the foregoing basis. It is noted that some exterior surfaces of the foam may be coated with the pressure sensitive adhesive. The foregoing weights include the weight of any such material coated onto those exterior surfaces.

The coated foam exhibits an increased recovery time, compared to that of the starting polyurethane foam. The recovery time may be increased to at least 150%, to at least 200%, to at least 300%, to at least 400%, or to at least 500% of that of the starting polyurethane foam, and may be increased to up to 1000% thereof or even more.

In absolute terms, the recovery time of the coated foam may be at least 3 seconds, at least 4 seconds, at least 6 seconds, at least 8 seconds or to at least 10 seconds. Recovery time may be in some embodiments up to 20 seconds or up to 15 seconds.

An important advantage of this invention is the increase in recovery time can be obtained without significant deterioration of other important properties such as resiliency and airflow. The resiliency value tends to be very similar to those of starting foam, with little changes even as the weight of the pressure sensitive adhesive increases. Therefore, the coated foam of the invention typically has resiliency values as described above with regard to the starting polyurethane foam.

Airflow shows little change, despite the application of the pressure sensitive adhesive. Thus, the product coated foam may have an airflow as described above with regard to the starting polyurethane foam. This is unexpected, given the increased mass of coated foam relative to the starting polyurethane foam and the significant effect of the pressure sensitive adhesive coating on recovery time, and is very beneficial. The coated foam therefore combines the desirable properties of viscoelastic behavior (especially long recovery time) with high airflow. These attributes in conjunction are important to perceived comfort in bedding and other comfort applications.

When the starting polyurethane foam has a glass transition temperature of 16° C. or lower, the coated foam of the invention exhibits an especially desirable set of properties; namely high airflow, long recovery time, and softness at the temperatures at which the foam is most commonly used, warehoused and fabricated into downstream products.

The density of the coated foam is generally somewhat higher than that of the starting polyurethane foam due to the application of the pressure sensitive adhesive coating. The density may be, for example, 5 to 35 percent higher than that of the starting foam.

The coated foam of the invention is useful for bedding and other comfort applications, in acoustic applications to reduce noise, vibration and/or harshness, for earplugs, and in other applications in which previous viscoelastic polyurethane foams are useful. It is especially useful as a cushioning layer in mattresses, pillows, seat cushions and other comfort applications.

The following examples are provided to illustrate the invention, but are not intended to limit the scope thereof. All parts and percentages are by weight unless otherwise indicated.

EXAMPLES 1-5 AND COMPARATIVE SAMPLES A AND B

Comparative Sample A is an untreated flexible foam that has properties as indicated in Table 1 below. This foam has a glass transition temperature of 15° C.

Comparative Sample B and Examples 1-5 each are prepared by separately coating a specimen of Comparative Sample A with a pressure sensitive adhesive emulsion sold as ROBOND® PS-90 by The Dow Chemical Company. This product is a one-component alkyl acrylate polymer that does not contain a tackifier, in the form of a 53% solids emulsion in an aqueous liquid phase. The dried adhesive has a glass transition temperature of approximately −40° C.

To coat the samples, the pressure sensitive adhesive product is diluted with various amounts of water. The diluted emulsion is poured into an 800-mL open vessel. The starting foam specimen in each case has its skin removed, and is dried and weighed. The foam specimen is then immersed in the diluted emulsion, squeezed manually, immersed a second time and squeezed again to remove excess emulsion. Pressure is released to re-expand the foam and allow gas to reenter the cells. The foams are dried overnight under ambient conditions (about 22° C.), and then dried at 80° C. for at least one hour. The resulting coated foams are then weighed and conditioned (25° C./50% relative humidity) overnight for property testing according to ASTM D3574 (recovery time according to the process described hereinbefore). Results are as indicated in Table 1.

TABLE 1

| Property | Sample Designation | | | | | | |
|---|---|---|---|---|---|---|---|
| | A* | B* | 1 | 2 | 3 | 4 | 5 |
| Dilution ratio[1] | N/A | 10:1 | 2:1 | 1.5:1 | 1:1 | 0.5:1 | 0.2:1 |
| Wt. % PSA[2] | 0 | 0.7 | 2.2 | 8.3 | 10.2 | 17.2 | 23.8 |
| Foam Density, kg/m³ | 47.7 | 48.0 | 48.8 | 52.0 | 53.1 | 57.6 | 62.6 |
| Airflow, L/s | 1.7 | 2.1 | 2.2 | 2.15 | 2.2 | 2.1 | 2.1 |
| Resiliency, % | 3.0 | 3.0 | 3.0 | 3.0 | 2.8 | 3.0 | 3.0 |
| Recovery time, s | 2.2 | 2.1 | 4.0 | 6.0 | 6.2 | 10.1 | 14.6 |

*Not an example of the invention.
[1]Weight ratio of water to ROBOND ® PS-90 emulsion product.
[2]Calculated as (weight coated foam − weight starting foam) ÷ weight coated foam. PSA is pressure sensitive adhesive.

As can be seen from the data in Table 1, above an initial threshold, recovery time increases steadily with increasing coating weight of the pressure sensitive adhesive. Resiliency is essentially unaffected. Foam density increases in proportion to the added weight of the coating, which indicates that the coating process does not result in cell collapse or other undesirable densification effect.

Airflow for the treated foams in all cases is higher than that of Comparative Sample A. This indicates that pore clogging is essentially absent and that the pressure sensitive adhesive instead forms a thin coating on the internal surfaces of the foam. The increase in airflow may be due to additional cell opening that takes place during the compression steps.

What is claimed is:

1. A viscoelastic foam comprising a) an open-celled flexible polyurethane foam having a resiliency of no more than 20% and a recovery time of 5 seconds or less, the open-celled flexible polyurethane foam having internal surfaces coated with b) a pressure sensitive adhesive having a glass transition temperature of at most 0° C., wherein the pressure sensitive adhesive constitutes 1.5 to 35% of the combined weights of a) and b).

2. The viscoelastic foam of claim 1 wherein the pressure sensitive adhesive constitutes up to 25% of the combined weights of a) and b).

3. The viscoelastic foam of claim 2 wherein the open-celled flexible polyurethane foam has a glass transition temperature of at most 16° C.

4. The viscoelastic foam of claim 3 wherein the open-celled flexible polyurethane foam has an airflow of at least 0.944 L/s a density of 32 to 64 kg/m³.

5. The viscoelastic foam of claim 4 wherein the open-celled flexible polyurethane foam has a recovery time of up to 2 seconds.

6. The viscoelastic foam of claim 4 wherein the pressure sensitive adhesive is not isocyanate-based.

7. The viscoelastic foam of claim 4 wherein the pressure sensitive adhesive is an acrylic polymer having a glass transition temperature of no higher than −20° C.

8. The viscoelastic foam of claim 4 which has a recovery time at least 200% of the recovery time of the open-celled flexible polyurethane foam.

9. A method of reducing the recovery time of an open-celled polyurethane foam, comprising
   (1) impregnating a starting flexible polyurethane foam having a resiliency of no more than 20% and a recovery time of 5 seconds or less with a solution or emulsion of a pressure sensitive adhesive in a liquid carrier, the pressure sensitive adhesive having a glass transition temperature of no greater than 0° ° C., to wet internal surfaces of the foam and form an impregnated foam, and
   (2) removing the liquid carrier from the impregnated foam to produce a coated foam having a coating of the pressure sensitive adhesive on the internal surfaces of the flexible polyurethane foam, wherein the coating of the pressure sensitive adhesive constitutes 1.5 to 35% of the weight of the coated foam.

10. The method of claim 9 wherein the pressure sensitive adhesive is not isocyanate-based.

11. The method of claim 10 wherein the pressure sensitive adhesive is an acrylic polymer having a glass transition temperature of no higher than 20° C.

12. The method of claim 9 wherein step (1) is performed by steps including:
   (1-A) immersing the starting flexible polyurethane foam into the solution or emulsion of the pressure sensitive adhesive and/or by applying the solution or emulsion of the pressure sensitive adhesive to a surface of the starting flexible polyurethane foam and allowing it to penetrate into the starting flexible polyurethane foam; and
   1-B) mechanically compressing the foam while immersed or otherwise in contact with the solution or emulsion.

13. The method of claim 9 wherein the recovery time of the coated foam is at least 200% of the recovery time of the starting flexible polyurethane foam.

14. A flexible polyurethane foam made according to the method of claim 9.

* * * * *